US012628063B2

(12) United States Patent
Patel et al.

(10) Patent No.: US 12,628,063 B2
(45) Date of Patent: May 12, 2026

(54) PUBLIC IP USAGE OPTIMIZATION

(71) Applicant: Boost SubscriberCo L.L.C.,
Englewood, CO (US)

(72) Inventors: Prakash Patel, Englewood, CO (US);
Partha Tripathy, Englewood, CO
(US); Brian Peletz, Englewood, CO
(US); Mohammad Dawood Shahdad,
Aurora, CO (US)

(73) Assignee: Boost SubscriberCo L.L.C.,
Englewood, CO (US)

( * ) Notice: Subject to any disclaimer, the term of this
patent is extended or adjusted under 35
U.S.C. 154(b) by 443 days.

(21) Appl. No.: 18/295,780

(22) Filed: Apr. 4, 2023

(65) Prior Publication Data

US 2024/0340758 A1 Oct. 10, 2024

(51) Int. Cl.
*H04W 40/02* (2009.01)
*H04W 80/04* (2009.01)

(52) U.S. Cl.
CPC ............ *H04W 40/02* (2013.01); *H04W 80/04*
(2013.01)

(58) Field of Classification Search
CPC .............................. H04W 40/02; H04W 80/04
See application file for complete search history.

(56) References Cited

U.S. PATENT DOCUMENTS

| | | | | | |
|---|---|---|---|---|---|
| 2005/0249150 | A1* | 11/2005 | Johnson, Jr. | ...... | H04M 3/42382 |
| | | | | | 370/328 |
| 2005/0250520 | A1* | 11/2005 | Johnson, Jr. | ........ | H04W 88/184 |
| | | | | | 455/466 |
| 2008/0043763 | A1* | 2/2008 | Johnson, Jr. | ...... | H04M 3/42382 |
| | | | | | 370/328 |
| 2010/0268763 | A1* | 10/2010 | Rasanen | ............. | H04L 61/2578 |
| | | | | | 709/203 |

* cited by examiner

*Primary Examiner* — Gary Mui
*Assistant Examiner* — Yewon Kim
(74) *Attorney, Agent, or Firm* — Kipman T. Werking;
Frontier IP Law PLLC

(57) ABSTRACT

A disclosed method may include (i) disposing a network
access table gateway between a multimedia service center
within a cellular service network and a telecommunications
server of an external wireless network provider that has
partnered with the cellular service network, (ii) receiving, at
the network access table gateway, a network packet that was
sent from the telecommunications server of the external
wireless network provider and that is directed to a public
Internet Protocol address of the network access table gate-
way, and (iii) routing, by referencing a network access table
of the network access table gateway, the network packet to
a destination within the cellular service network. Related
systems and computer-readable mediums are further dis-
closed.

20 Claims, 10 Drawing Sheets

900

100

500

700

PUBLIC IP USAGE OPTIMIZATION

BRIEF SUMMARY

This application is generally directed to public IP usage optimization, as discussed in more detail below. In some examples, a method may include (i) disposing a network access table gateway between a multimedia service center within a cellular service network and a telecommunications server of an external wireless network provider that has partnered with the cellular service network, (ii) receiving, at the network access table gateway, a network packet that was sent from the telecommunications server of the external wireless network provider and that is directed to a public Internet Protocol address of the network access table gateway, and (iii) routing, by referencing a network access table of the network access table gateway, the network packet to a destination within the cellular service network.

In some examples, the multimedia service center within the cellular service network connects to the telecommunications server of the external wireless network provider that has partnered with the cellular service network using a microservice.

In some examples, the microservice operates according to the MM4 standard of the MMS architecture.

In some examples, the microservice communicates over the SMTP protocol.

In some examples, the telecommunications server of the external wireless network provider that has partnered with the cellular service network communicates over a predefined telecommunications interconnection model for exchange of Internet Protocol based traffic between users of separate telecommunications providers.

In some examples, the predefined telecommunications interconnection model comprises IPX.

In some examples, disposing the network access table gateway comprises substituting a public Internet Protocol address of the network address table gateway for multiple respective public Internet Protocol addresses of respective multiple microservices.

In some examples, the network address table gateway is configured within an on-demand public cloud computing platform.

In some examples, routing, by referencing the network access table of the network access table gateway, the network packet comprises routing the network packet to an internal Internet Protocol address within the cellular service network.

In some examples, the internal Internet Protocol address points to a location within the multimedia service center.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
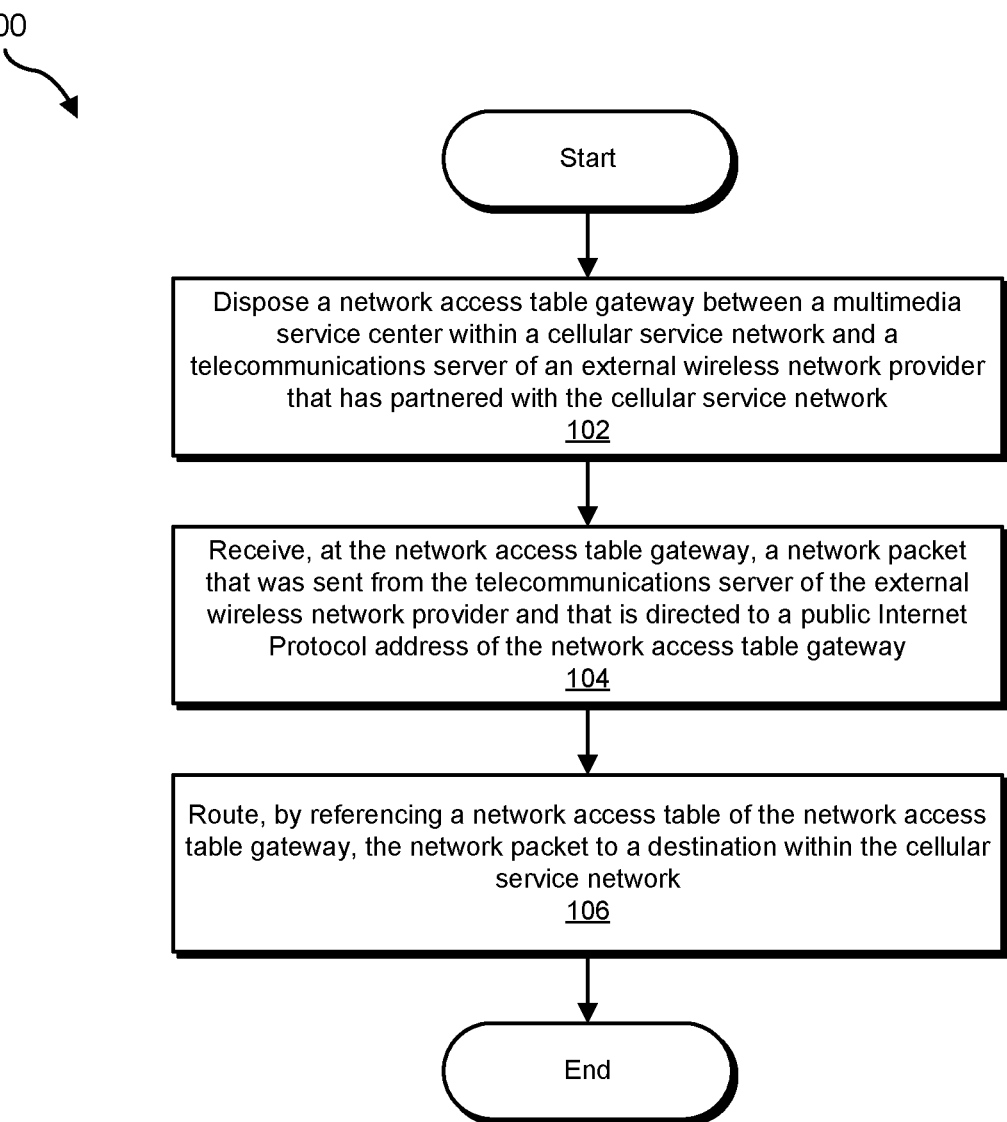
FIG. 1 shows a flow diagram for an example method for optimizing public IP usage.

FIG. 1 shows a flow diagram for an example method 100 for optimizing public IP usage. At step 102, one or more of the systems described herein may dispose a network access table gateway between a multimedia service center within a cellular service network and a telecommunications server of an external wireless network provider that has partnered with the cellular service network. At step 104, one or more of the systems described herein may receive, at the network access table gateway, a network packet that was sent from the telecommunications server of the external wireless network provider and that is directed to a public Internet Protocol address of the network access table gateway. Lastly, at step 106, one or more of the systems described herein may route, by referencing a network access table of the network access table gateway, the network packet to a destination within the cellular service network. Additional details of method 100 and/or descriptions of further embodiments will be provided below in connection with FIGS. 2-9.

Figure 2:
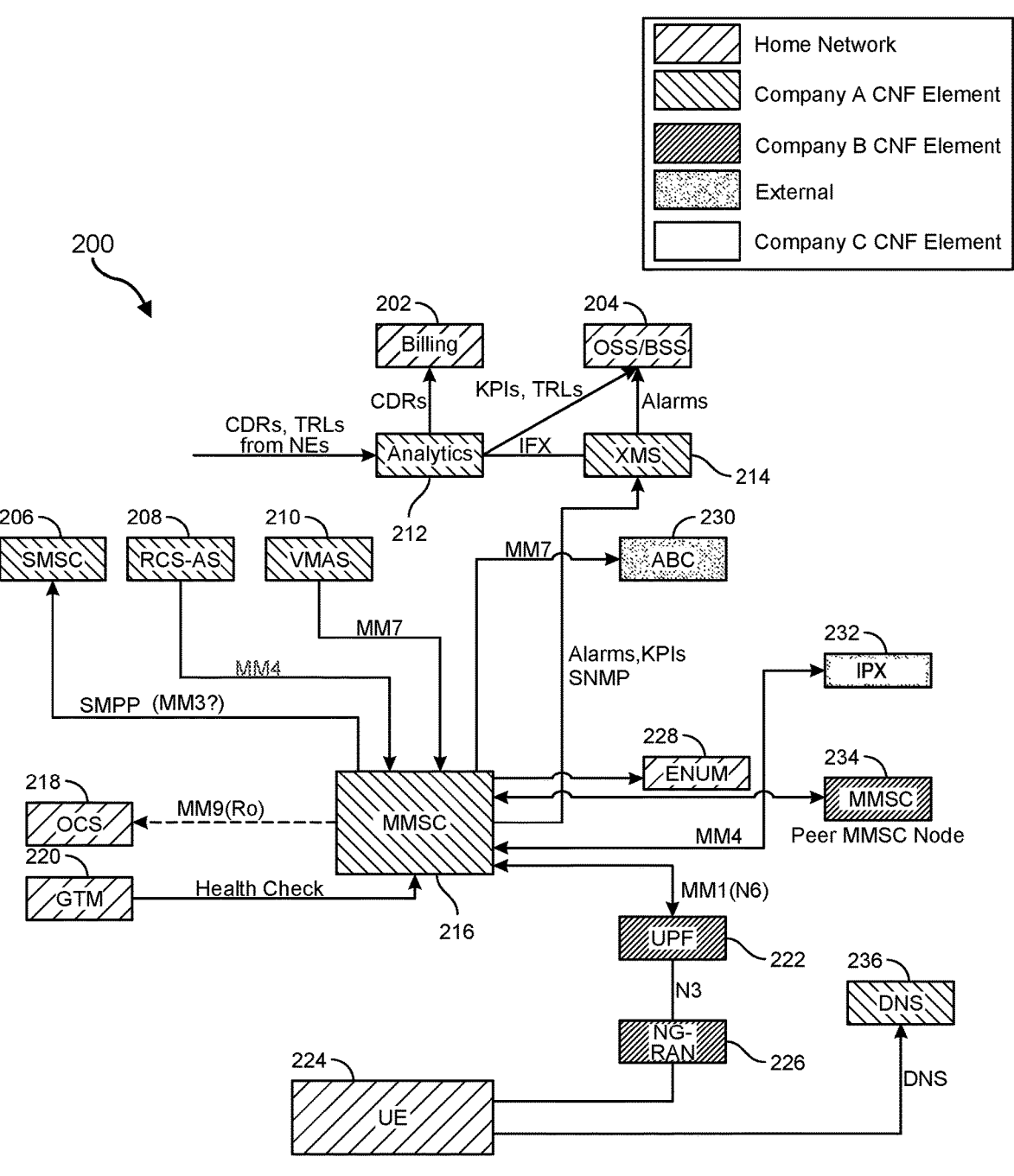
FIG. 2 shows a diagram of a home cellular network interconnecting with an additional partnering network.

FIG. 2 shows a diagram 200 for an example wireless network interconnection system between a home network, as indicated by the legend shown in this figure, and one or more "external" servers, nodes, devices, networks, and/or partners, as discussed further below. As further shown in this figure, diagram 200 may include a multimedia service center 216, an off-line charging system 218, a global traffic monitoring unit 220, a user equipment 224, a radio access network 226, a user plane function 222, a domain name service 236, a peer multimedia service center node 234, an ENUM interface 228, an IPX node 232, an external partner node 230 named "ABC", an XMS interface 214 for managing the configuration within the multimedia service center, an OSS/BSS unit 204 for generating one or more alarms, an analytics component 212, a billing component 202, a voicemail application server 210, a rich communication component 208, and a short message service center 206. This figure also further highlights how some components are directly administered and managed by the home network such as ENUM interface 228, whereas other components are directly administered and managed by one or more partnering companies or networks, such as Company A, Company B, and/or Company C, as indicated by the legend of this figure. Additionally, the figure further highlights how some components are "external" components that have a level of external separation from the home network and Companies A-C, as discussed further below. Method 100 and the technology of this application may focus, in some embodiments, on the interconnection between multimedia service center 216 and components identified as external within this figure, such as external partner node 230 and IPX node 232. IPX node 232 may refer to a server or other node that communicates over a predefined telecommunications interconnection model for exchange of Internet Protocol based traffic between users of separate telecommunications providers (in this example, the IPX or IP eXchange model). As used herein, the term "cellular service network" can refer to any one or more interconnected portions of diagram 200 interfacing with external components to provide cellular service to users.

By way of background, SMS stands for Short Message Service, and MMS stands for Multimedia Messaging Service. Both are mobile messaging protocols that are used to send messages between mobile devices. SMS was first introduced in the 1980s as a way to send short text messages between mobile devices. The SMS protocol operates over the signaling channels of the mobile network, which are typically used to exchange control messages between the network and the mobile device. SMS messages are limited to 160 characters in length, and can contain only text.

MMS, on the other hand, was introduced in the early 2000s as an extension to SMS that allowed for the transmission of multimedia content, such as pictures, videos, and audio files. MMS messages can be much larger than SMS messages, and can include a variety of different types of media. Nevertheless, in some examples, MMS messages require a data connection to be sent and received, which can be more expensive than SMS messages.

Both SMS and MMS operate over the mobile network using a client-server architecture. When a user sends a message, the message is sent from the mobile device to a message center (SMSC for SMS, MMSC for MMS, as in FIG. 2) on the mobile network. The message center then forwards the message to the recipient's device or message center, depending on whether the message is an SMS or MMS. SMS and MMS are widely used for both personal and business communication. SMS is particularly popular for sending short, simple messages, such as appointment reminders or alerts. MMS is often used to send multimedia content, such as pictures and videos, as part of marketing campaigns or other promotional activities. In summary, SMS and MMS are mobile messaging protocols that are used to send messages between mobile devices. SMS is a text-based protocol that operates over the signaling channels of the mobile network, while MMS is a multimedia protocol that requires a data connection. Both protocols operate using a client-server architecture, with messages being sent from the mobile device to a message center on the mobile network.

FIG. 2 also illustrates how, in some examples, multimedia service center 216 may communicate with one or more external components or nodes using a microservice. In particular, this figure highlights how multimedia service center 216 may communicate with one or more external components using the MM1 or MM4 microservices, which are two respective standards within the MMS architecture. In the case of MM4, the macro service may communicate over the SMTP protocol, as understood by those having skill in the art. This particular microservice operates according to the MM4 standard of the MMS architecture.

Figure 3:
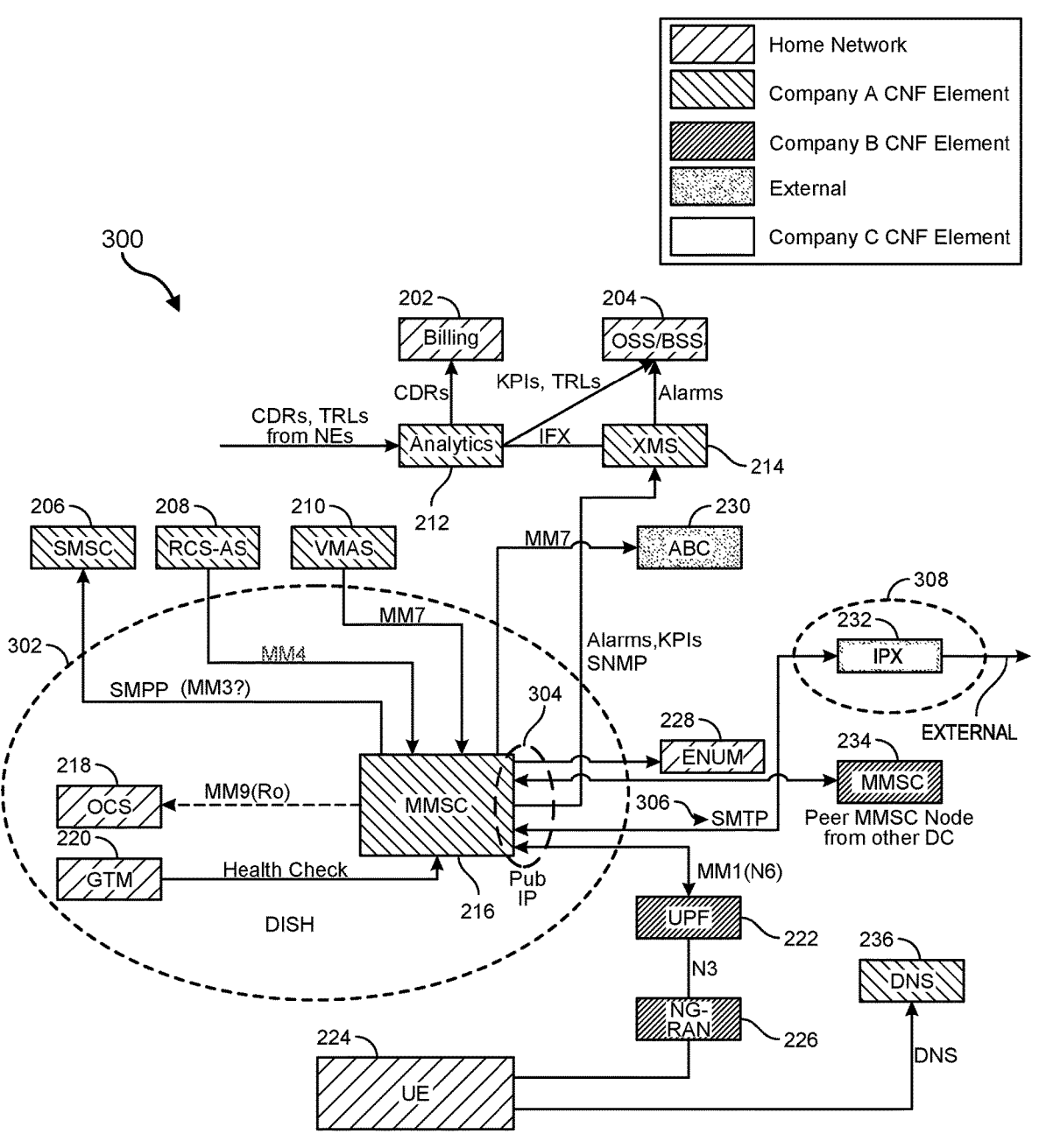
FIG. 3 shows an updated diagram of the home cellular network interconnecting with the additional partnering network.

FIG. 3 shows an updated diagram 300 that inserts an additional highlight 302, an additional highlight 304, and an additional highlight 308 into diagram 200. Highlight 302 draws attention to components of diagram 200 that may communicate with one or more external components through an interface that includes a multitude of public Internet Protocol addresses. Highlight 304 draws attention to the location where these public Internet Protocol addresses target one or more locations at multimedia service center 216. Furthermore, highlight 308 draws attention to one external component, IPX node 232, which may communicate with one or more of the components highlighted by highlight 302 over one or more microservices, as discussed in more detail below. Highlight 304 draws attention to the fact that, in the configuration of FIGS. 2-3, a multitude of different public Internet Protocol addresses might be leveraged at the interface of multimedia service center 216 to receive communications from one or more external components. The multitude of different Internet Protocol addresses can become unwieldy, or undesirable, such that it may be beneficial to simplify or otherwise optimize this configuration to reduce the number of public Internet Protocol addresses.

Figure 4:
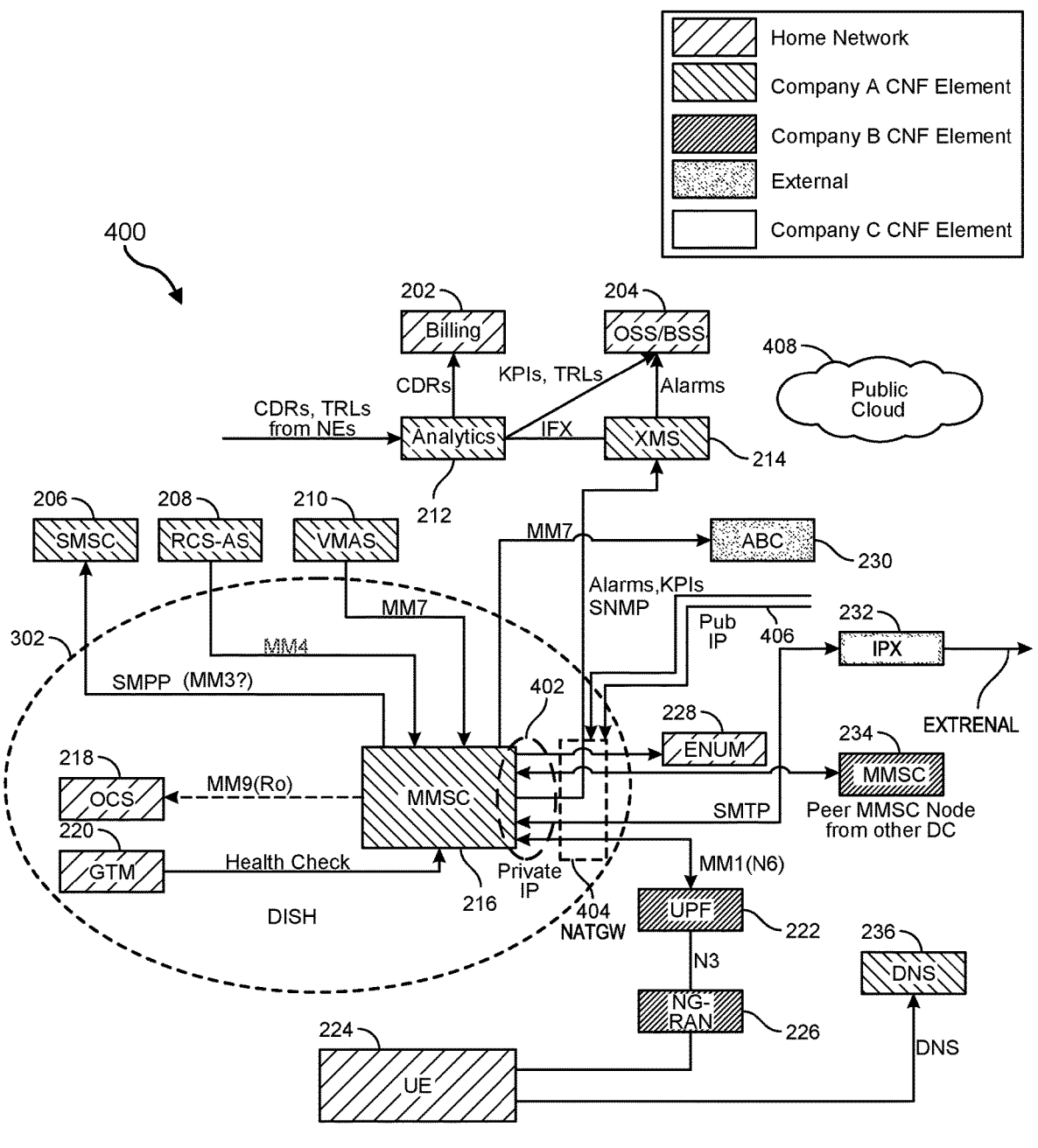
FIG. 4 shows another updated diagram of the home cellular network interconnecting with the updated partnering network due to the insertion of a network access table gateway.

To address the shortcomings outlined above, and associated with the configuration of FIGS. 2-3, FIG. 4 shows another updated diagram 400, in which a network access table gateway 404 ("NATGW") has been introduced at the interface of multimedia service center 216 when communicating with one or more external components, such as IPX node 232. As understood by those having skill in the art, a network access table gateway is a device that is used to connect devices on a private network to the Internet or other wide area network. The network access table gateway can work by translating the private Internet Protocol addresses of devices on the local network to a single public Internet Protocol address that can be used on the Internet. When a device on the private network sends a request to access the Internet, the network access table gateway replaces the source Internet Protocol address of the request with its public Internet Protocol address and forwards the request to the Internet. When the response is received, the network access table gateway can use the information in its network access table to translate the public Internet Protocol address back to the private Internet Protocol address of the device that made the request. This allows devices on the private network to communicate with the Internet without revealing their private Internet Protocol addresses. In some examples, rather than constituting a physical hardware network address table gateway, the network address table gateway may instead constitute a configurable software or network component, which can be configured within an on-demand public cloud computing platform, such as public cloud 408 shown in FIG. 4. In some more specific examples, the public cloud may correspond to an elastic service based on a container orchestration system for automating software deployment, scaling, and management, and this system can be open source, such as Kubernetes. The usage of configurable software or network components as network address table gateways within such platforms can facilitate and streamline ease-of-use, for example.

In some examples, the network access table gateway can keep a record of the requests made by devices on the private network in its network access table. This table contains the source Internet Protocol address and port number of the request, as well as the translated public Internet Protocol address and port number. The network access table gateway can use this information to ensure that the responses from the Internet are sent back to the correct device on the private network. The network access table gateway can also allow multiple devices to share a single public Internet Protocol address, which can help conserve Internet Protocol addresses and make it easier to manage a large network.

Returning to the example of FIG. 4, the multitude of public Internet Protocol addresses highlighted by highlight 304 in FIG. 3 has been effectively substituted, in diagram 400, with private internal Internet Protocol addresses 402. In this new configuration, network packets 406 from one or more external components, such as IPX node 232, can be directed to the public Internet Protocol address of network access gateway 404. Private internal Internet Protocol addresses 402 can be reached by one or more external components, such as IPX node 232, through the translation process executed at network access table gateway 404, as further discussed above. In some examples, these private internal Internet Protocol addresses are disposed broadly within the corresponding cellular or partner service network. Additionally, or alternatively, in further examples, a corresponding internal Internet Protocol address points to a location within multimedia service center 216. Due to this improvement or modification, the costs, delays, inefficiencies, and/or the hassles or inconveniences associated with the multitude of public Internet Protocol addresses can be reduced or eliminated.

Figure 5:
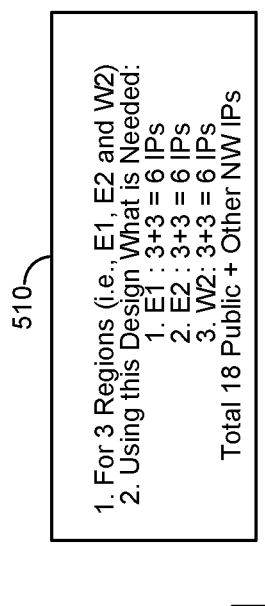
FIG. 5 shows a diagram of a multimedia service center communicating with incoming and outgoing messaging HUBs.
Figure 5:
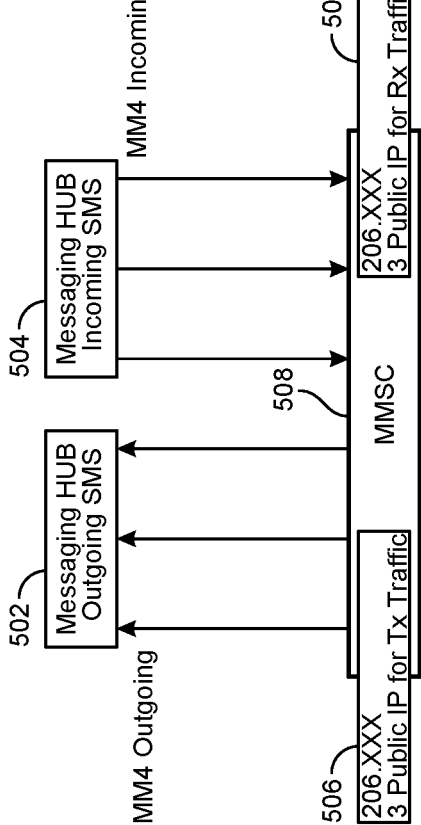
Figure 6:
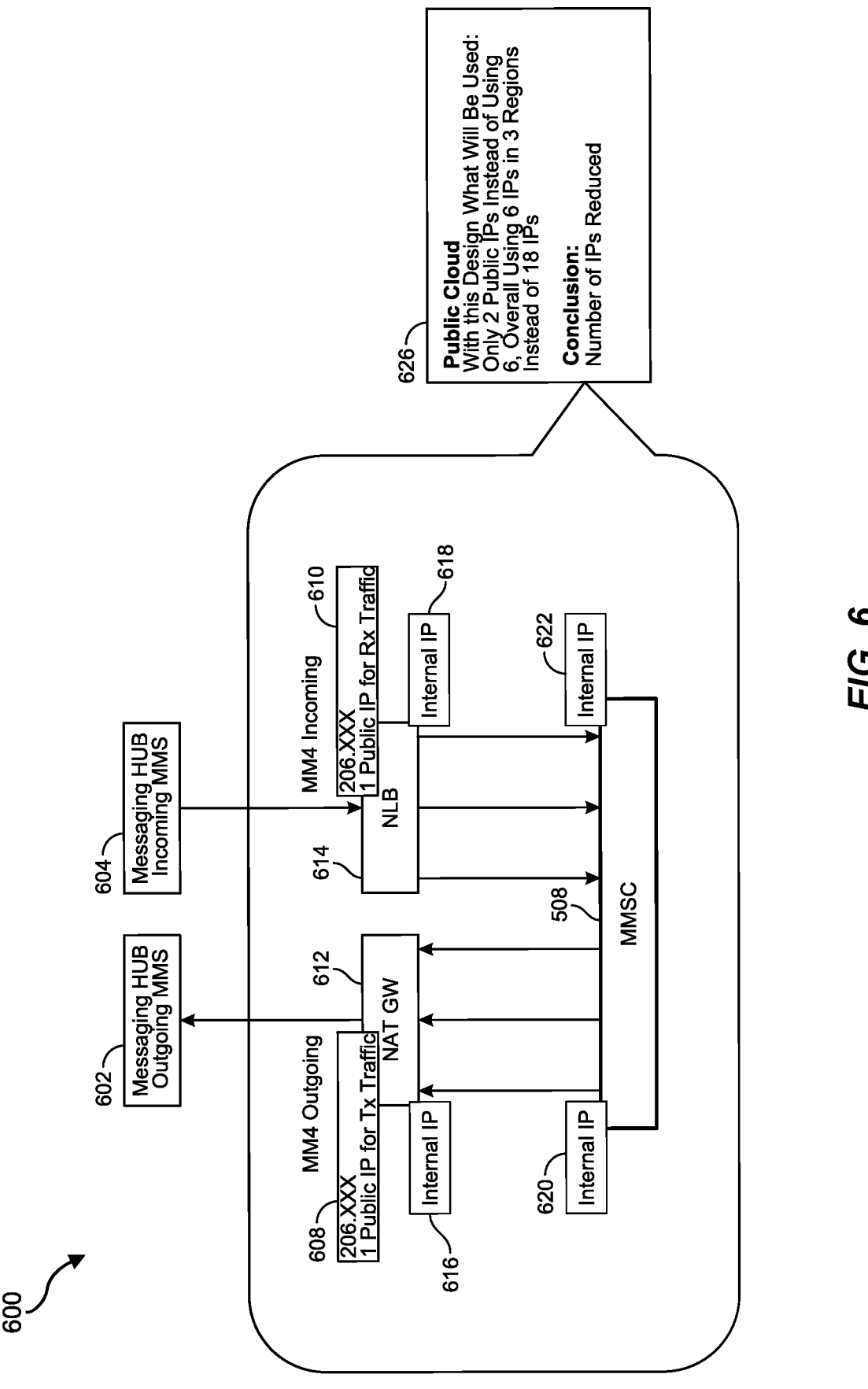
FIG. 6 shows an updated diagram of the multimedia service center communicating with incoming and outgoing messaging HUBs after the optimization of public IP usage.

FIGS. 5-6 show two diagrams, diagram 500 and diagram 600, respectively, which further highlight and illustrate differences between the related configuration of FIGS. 2-3 (corresponding to FIG. 5) and the improvement of FIG. 4

(corresponding to FIG. 6). Diagram 500 in FIG. 5 shows that a multimedia service center 508 may communicate with a messaging HUB 502 for outgoing SMS or other messages. Furthermore, diagram 500 also shows how multimedia service 508 may communicate with a messaging HUB 504 for incoming SMS or other messages. Diagram 500 also illustrates how, according to this related configuration, three separate public Internet Protocol addresses are effectively required for outgoing SMS traffic and an additional three separate public Internet Protocol addresses are effectively required for incoming SMS traffic. This configuration created a total of six different public Internet Protocol addresses, as highlighted by indicators 506. Box 510 also further explains how, for a cellular service provider operating within three separate regions, three additional instances of these six separate public Internet Protocol addresses would be required, bringing the total to 18 in this example. Those having skill in the art can ascertain how, as the number of total public Internet Protocol addresses continues to increase, the number can become unwieldy, expensive, cumbersome, and/or inefficient, as further discussed above.

In contrast, diagram 600 in FIG. 6 improves upon diagram 500 by introducing network access table gateway 612 and network load balancer 614, where HUB 602 and HUB 604 parallel the HUBs in FIG. 5. Network access table gateway 612 and network load balancer 614 enable the usage of internal Internet Protocol addresses 616-622, as shown in this figure. The network access table gateway can be used for outgoing multimedia service messages, and the network load balancer can be used for incoming multimedia service messages, as further shown in this figure. These two components only reveal a single public Internet Protocol address each for transmitting and receiving traffic, respectively, as highlighted by indicators 608-610. In this manner, the improvement of diagram 600 effectively reduces the overall number of public Internet Protocol addresses, which are associated with the various drawbacks and inefficiencies outlined above. Box 626 also further explains how, according to this improvement, only two public Internet Protocol addresses can be used for each region instead of using six, and in the case of three separate regions, the total is only six Internet Protocol addresses rather than 18.

The reader may recognize that, in FIG. 6, incoming traffic from an external partner to a multimedia messaging service center (i.e., MMSC 508 operated in coordination with a cellular service provider) can reach the network load balancer 614. In contrast, outgoing traffic from MMSC 508 to one or more external partners can traverse through a network address table gateway, such as network access table gateway 612. For brevity and ease of discussion, this relationship is shown more clearly in FIG. 6, and yet FIG. 4 can be interpreted in a parallel manner.

Figure 7:
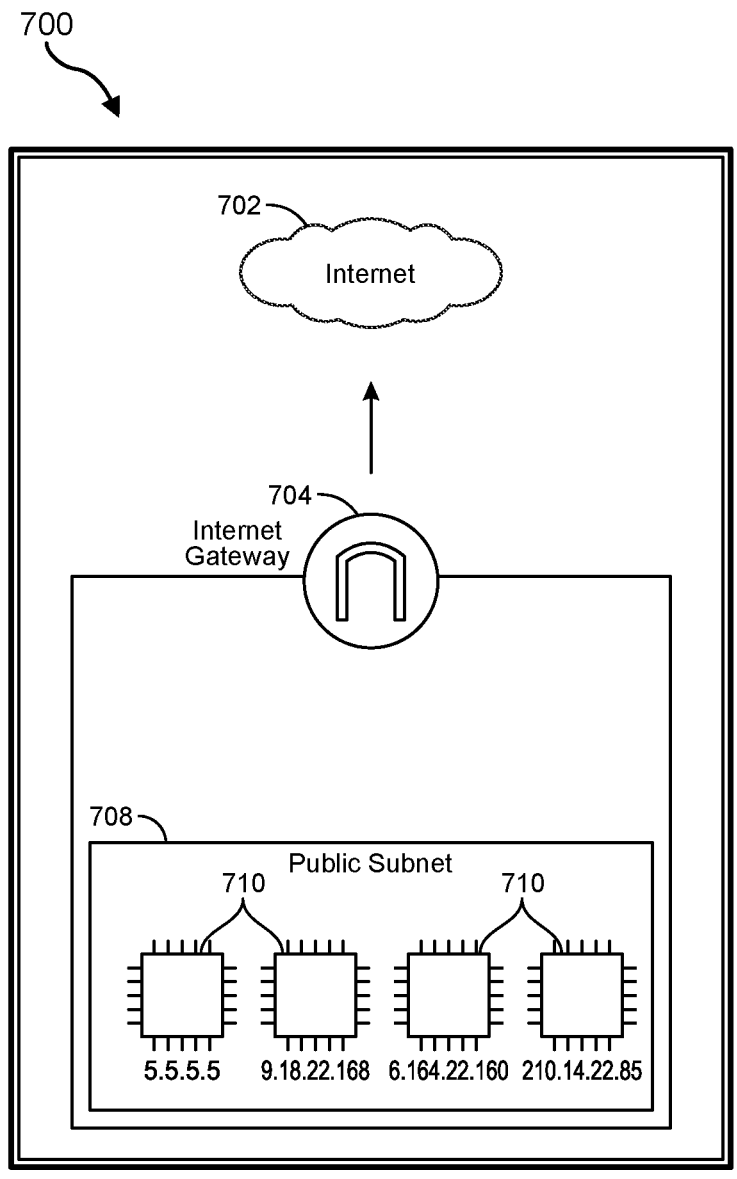
FIG. 7 shows a diagram of an Internet gateway interconnecting with the Internet using a public subnet.
Figure 8:
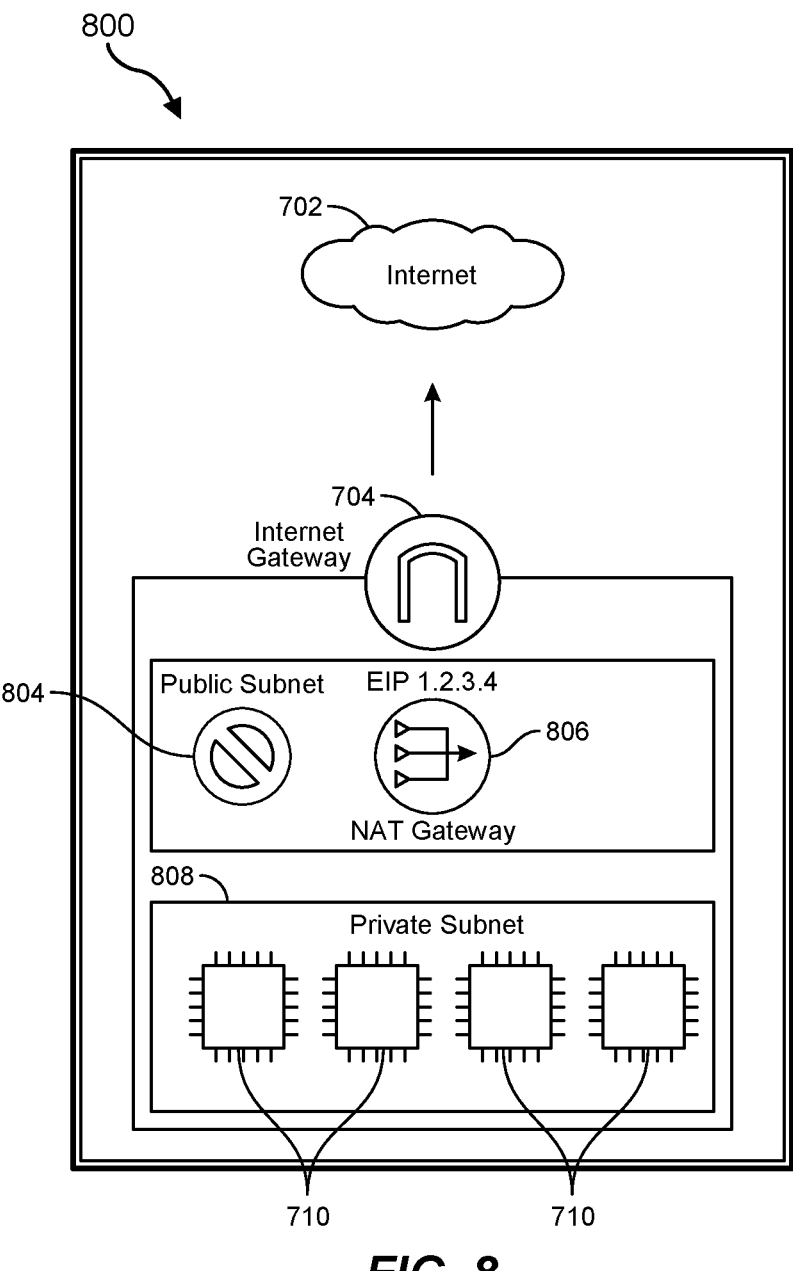
FIG. 8 shows an updated diagram of the Internet gateway interconnecting with the Internet using the public subnet after the insertion of a network access table gateway.
Figure 9:
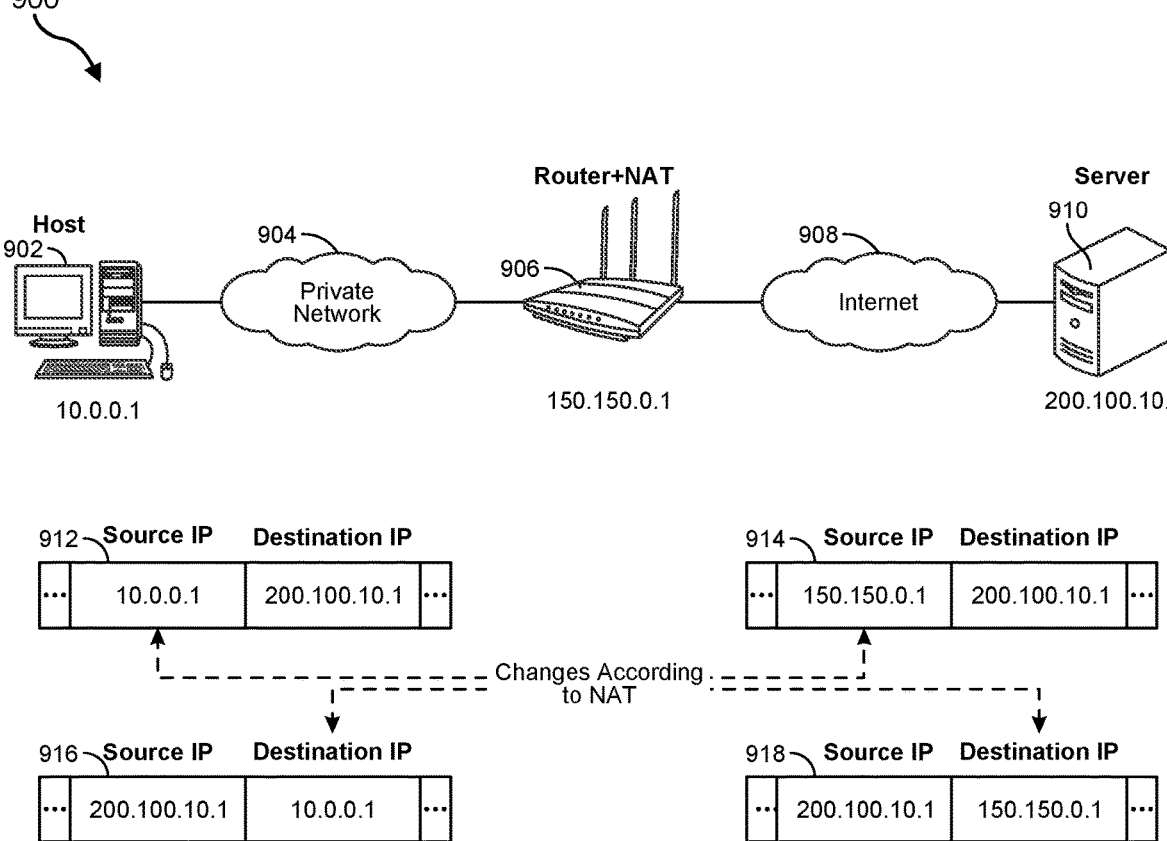
FIG. 9 shows a diagram that illustrates the operation of a network access table gateway.

FIGS. 7-9 further help to illustrate the operation of a network access table gateway. Diagram 700 in FIG. 7 further includes the Internet 702, an Internet gateway 704, a public subnet 708, and instances 710 of public Internet Protocol addresses. To address the drawbacks and inefficiencies associated with a larger number of public Internet Protocol addresses, diagram 800 of FIG. 8 introduces a network access table gateway 806, thereby eliminating the corresponding public subnet and associated Internet Protocol addresses, as indicated by indicator 804. Moreover, in diagram 800, public subnet 708 has been effectively converted to a private subnet 808 through the usage of network access table gateway 806.

By way of background, a subnet, short for subnetwork, is a logical subdivision of an Internet Protocol network. An IP network can be composed of multiple devices that communicate with each other using unique Internet Protocol addresses. However, as the size of the network grows, managing all the devices becomes increasingly complex. A subnet enables network administrators to divide a large network into smaller, more manageable segments, each with its own range of Internet Protocol addresses. This can improve network performance, security, and organization.

In a subnet, devices can be grouped together based on a common network prefix, which is a portion of the Internet Protocol address that identifies the network. For example, in a network with Internet Protocol address 192.168.1.0, a subnet might be created with a network prefix of 192.168.1.0/24. This means that all devices within the subnet will have Internet Protocol addresses that start with the same three numbers, followed by a fourth number that can range from 0 to 255. Subnets can also be further divided into smaller subnets, each with its own network prefix and Internet Protocol address range. This is known as subnetting. Subnetting can be used to create hierarchical network structures, with smaller subnets nested within larger ones. This can help to improve network efficiency and organization, as well as to enhance security by isolating different segments of the network from each other. In summary, a subnet is a way to divide a large network into smaller, more manageable segments. By creating subnets, network administrators can improve network performance, security, and organization.

FIG. 9 shows a diagram 900 that further illustrates the mechanics of network address translation through a network address table gateway. Diagram 900 further includes a host 902, a private network 904, a router 906, a wide area network 908 such as the Internet, a server 910, and pairs of Internet Protocol addresses 912-918. Diagram 900 further illustrates how, in this example, the source Internet Protocol address for pair 912 has been changed to the public Internet Protocol address for router 906 that features network address translation through a corresponding table. Similarly, diagram 900 also further illustrates how, in pair 918, the destination Internet Protocol address has been changed from the public Internet Protocol address for router 906 to the actual source Internet Protocol address, which may be private and internal, as discussed above, through network address translation, to properly route the corresponding network packet to host 902 within private network 904.

Figure 10:
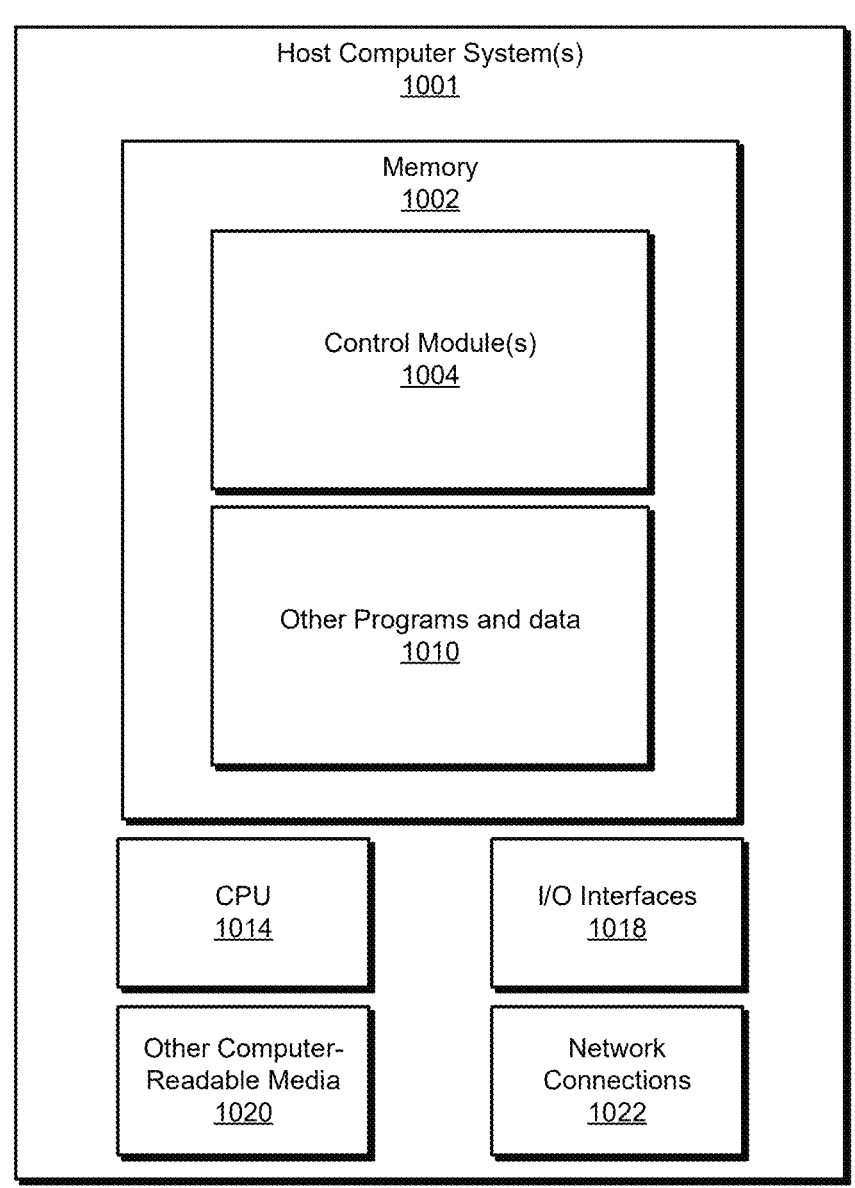
FIG. 10 shows an example computing system that may be configured to execute one or more instances of functionality described herein.

FIG. 10 shows a system diagram that describes an example implementation of a computing system(s) for implementing embodiments described herein. The functionality described herein can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they are agnostic to the underlying cloud infrastructure, allowing higher deployment agility and flexibility. However, FIG. 10 illustrates an example of underlying hardware on which such software and functionality may be hosted and/or implemented.

In particular, shown is example host computer system(s) 1001. For example, such host computer system(s) 1001 may execute a scripting application, or other software application, to perform method 100, as further discussed above, and/or to perform one or more of the other methods described herein. In some embodiments, one or more special-purpose computing systems may be used to implement the functionality described herein. Accordingly, various embodiments described herein may be implemented in software, hardware, firmware, or in some combination thereof. Host computer system(s) 1001 may include memory 1002, one or more central processing units (CPUs) 1014, I/O interfaces 1018, other computer-readable media 1020, and network connections 1022.

Memory 1002 may include one or more various types of non-volatile and/or volatile storage technologies. Examples of memory 1002 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 1002 may be utilized to store information, including computer-readable instructions that are utilized by CPU 1014 to perform actions, including those of embodiments described herein.

Memory 1002 may have stored thereon control module(s) 1004. The control module(s) 1004 may be configured to implement and/or perform some or all of the functions of the systems or components described herein. Memory 1002 may also store other programs and data 1010, which may include rules, databases, application programming interfaces (APIs), software containers, nodes, pods, clusters, node groups, control planes, software defined data centers (SDDCs), microservices, virtualized environments, software platforms, cloud computing service software, network management software, network orchestrator software, network functions (NF), artificial intelligence (AI) or machine learning (ML) programs or models to perform the functionality described herein, user interfaces, operating systems, other network management functions, other NFs, etc.

Network connections 1022 are configured to communicate with other computing devices to facilitate the functionality described herein. In various embodiments, the network connections 1022 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 1018 may include a video interface, other data input or output interfaces, or the like. Other computer-readable media 1020 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
   disposing a network address translation gateway between a multimedia service center within a cellular service network and a telecommunications server of an external wireless network provider that has partnered with the cellular service network;
   receiving, at the network address translation gateway, a network packet that was sent from the telecommunications server of the external wireless network provider and that is directed to a public Internet Protocol address of the network address translation gateway; and routing, by referencing a network address translation table of the network address translation gateway, the network packet to a destination within the cellular service network.

2. The method of claim 1, wherein the multimedia service center within the cellular service network connects to the telecommunications server of the external wireless network provider that has partnered with the cellular service network using a microservice.

3. The method of claim 2, wherein the microservice operates according to the MM4 standard of the MMS architecture.

4. The method of claim 2, wherein the microservice communicates over the SMTP protocol.

5. The method of claim 1, wherein the telecommunications server of the external wireless network provider that has partnered with the cellular service network communicates over a predefined telecommunications interconnection model for exchange of Internet Protocol based traffic between users of separate telecommunications providers.

6. The method of claim 5, wherein the predefined telecommunications interconnection model comprises IPX.

7. The method of claim 1, wherein disposing the network address translation gateway comprises substituting a public Internet Protocol address of the network address translation gateway for multiple respective public Internet Protocol addresses of respective multiple microservices.

8. The method of claim 1, wherein the network address translation gateway is configured within an on-demand public cloud computing platform.

9. The method of claim 1, wherein routing, by referencing the network address translation table of the network address translation gateway, the network packet comprises routing the network packet to an internal Internet Protocol address within the cellular service network.

10. The method of claim 9, wherein the internal Internet Protocol address points to a location within the multimedia service center.

11. A system comprising:

at least one physical processor; and at least one non-transitory physical memory encoding computer-executable instructions that, when executed by the at least one physical processor, cause operations to be performed comprising:

disposing a network address translation gateway between a multimedia service center within a cellular service network and a telecommunications server of an external wireless network provider that has partnered with the cellular service network;

receiving, at the network address translation gateway, a network packet that was sent from the telecommunications server of the external wireless network provider and that is directed to a public Internet Protocol address of the network address translation gateway; and routing, by referencing a network address translation table of the network address translation gateway, the network packet to a destination within the cellular service network.

12. The system of claim 11, wherein the multimedia service center within the cellular service network connects to the telecommunications server of the external wireless network provider that has partnered with the cellular service network using a microservice.

13. The system of claim 12, wherein the microservice operates according to the MM4 standard of the MMS architecture.

14. The system of claim 12, wherein the microservice communicates over the SMTP protocol.

15. The system of claim 11, wherein the telecommunications server of the external wireless network provider that has partnered with the cellular service network communicates over a predefined telecommunications interconnection model for exchange of Internet Protocol based traffic between users of separate telecommunications providers.

16. The system of claim 15, wherein the predefined telecommunications interconnection model comprises IPX.

17. The system of claim 11, wherein disposing the network address translation gateway comprises substituting a public Internet Protocol address of the network address translation gateway for multiple respective public Internet Protocol addresses of respective multiple microservices.

18. The system of claim 11, wherein the network address translation gateway is configured within an on-demand public cloud computing platform.

19. The system of claim 11, wherein routing, by referencing the network address translation table of the network address translation gateway, the network packet comprises routing the network packet to an internal Internet Protocol address within the cellular service network.

20. A non-transitory computer-readable medium encoding instructions that, when executed by at least one physical processor of a computing device, cause the computing device to perform operations comprising:

disposing a network address translation gateway between a multimedia service center within a cellular service network and a telecommunications server of an external wireless network provider that has partnered with the cellular service network;

receiving, at the network address translation gateway, a network packet that was sent from the telecommunications server of the external wireless network provider and that is directed to a public Internet Protocol address of the network address translation gateway; and routing, by referencing a network address translation table of the network address translation gateway, the network packet to a destination within the cellular service network.

* * * * *